United States Patent Office 3,161,608
Patented Dec. 15, 1964

3,161,608
POLYAMIDE MORDANT FOR DYEING SYNTHETIC TEXTILE FIBERS
John R. Caldwell and Edward H. Hill, Kingsport, Tenn., assignors to Eastman Kodak Company, Rochester, N.Y., a corporation of New Jersey
No Drawing. Filed Jan. 5, 1961, Ser. No. 80,734
8 Claims. (Cl. 260—13)

This invention relates to synthetic textile fibers and more particularly to a means of rendering certain types of such fibers not heretofore susceptible of dyeing with basic and cotton dyes capable of being satisfactorily dyed with these classes of dyes. The invention is especially concerned with a new type of polymeric polyamide mordant or dye absorber derived from hydroxy-aromatic dicarboxylic acids and diamines.

It is known that various types of synthetic textile fibers such as those composed of cellulose acetate of the acetone soluble variety, cellulose triacetate, acrylonitrile polymers, polyamides, polyesters or polyhydrocarbon polymers cannot be satisfactorily dyed with basic dyes nor with cotton dyes. This is due to the fact that these polymeric fibers are of such chemical constitution that they do not offer an affinity for the dye because there is no opportunity for chemical union between the dye and the fiber material. Because of this lack of affinity it has been extremely difficult, if not impossible, to dye fibers composed of such materials as secondary cellulose acetate, cellulose triacetate, polyacrylonitrile, polyamides, and high melting crystalline polyesters and polyhydrocarbon polymers, such as polyethylene and polypropylene with such basic dyes since there is at best only a superficial penetration of the dye into the fiber without chemical combination. The result has been that such fibers, either will not take the dye at all or will lose the dye in the course of the various textile processing steps to which the dyed fibers are subjected in the customary textile processing operation.

It is accordingly an object of this invention to provide a means of dyeing synthetic fibers of cellulose acetate of the acetone soluble variety, cellulose triacetate, acrylonitrile polymers, polyamides, polyesters, or hydrocarbon polymers such as polyethylene and polypropylene with basic dyes.

Another object of the invention is to provide a new type of dye mordanting agent which when added to such fibers, will render them susceptible of being satisfactorily and permanently dyed with basic dyes.

Another object of the invention is to provide polymeric organic mordanting agents or dye absorbers which are compatible with various types of polymeric fiber-forming materials, particularly such materials as cellulose triacetate, acrylonitrile polymers, polyamides, polyesters and polyhydrocarbon polymers and of such viscosity characteristics and compatibility with the fiber-forming material that they may be readily incorporated in and mixed with the polymeric material without separation into phases.

Another object of the invention is to provide new linear polyamides of relatively low melting point from hydroxy aromatic dicarboxylic acids and diamines which are useful as mordants or dye absorbers in rendering fibers composed of cellulose acetate of the acetone soluble variety, cellulose triacetate, acrylonitrile polymers, polyamides, polyesters and polyhydrocarbon polymers such as polyethylene and polypropylene, susceptible of dyeing with basic dyes.

Another object of the invention is to provide a means of facilitating the dyeing of such fibers with cotton dyes.

Another object is to provide improved textile and other fibers and related products composed of cellulose acetate, cellulose triacetate, acrylonitrile polymers, polyamides, polyesters and polyhydrocarbon polymers such as polyethylene and polypropylene permanently dyed with basic dyes or cotton dyes.

Other objects will appear hereinafter.

These and other objects of the invention are accomplished, according to one embodiment thereof, by reacting to form a linear polyamide, a diamine and a hydroxy aromatic dibasic acid containing at least 1 and not more than 2 aromatic nuclei and having one or two phenolic hydroxyl groups present in the molecule.

In practicing the invention the hydroxyacid is reacted with a diamine at a temperature of 180 to 300° C. and preferably at a temperature of 220 to 260° C. The reaction is carried out in an inert atmosphere such as nitrogen and under conditions which allow the removal of water from the reaction mixture.

In another method of preparing the polyamide, a diamine and a lower alkyl or phenyl ester of the hydroxy aromatic dibasic acid are heated together at a temperature of 140–250° C. with agitation.

In still another method of preparing the polyamide a diamine is treated with the acid chloride of the aromatic hydroxy dibasic acid in the presence of an acid acceptor such as an alkali metal hydroxide, an alkali metal carbonate or a tertiary amine.

The diamines which may be employed may be generally represented by the formula $H_2N—B—NH_2$ wherein B is (a) a straight chain, branched chain or cyclic alkylene radical containing from 2 to 12 carbon atoms and in which one or both of the amino groups may be present on a secondary carbon atom, (b) the group: $—(CH_2)_m—O—Y—O—(CH_2)_n—$ wherein Y is a divalent radical selected from the class consisting of straight chain alkylene groups, branched chain alkylene groups, cyclic alkylene groups and oxydialkylene groups and wherein $m$ and $n$ have the value 2 to 4.

(c) the group:

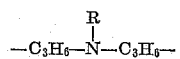

wherein R is a lower alkyl or phenyl group, and (d) is the group:

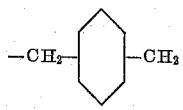

The diamines of class (a) above which may be satisfactorily employed in accordance with the invention are ethylenediamine, 1,3 - propanediamine, 1,2 - propanediamine, 1,3-butanediamine, 1,5-hexanediamine, 1,3-diaminocyclohexane, 1,4-diaminocyclohexane and 1,3-cyclohexane-bis(methylamine).

The diamines of class (b) may be 3,3'-(ethylenedioxy) bis(propylamine), 3,3'-(2,2-dimethyltrimethylenedioxy) bis(propylamine), 3,3'-(cyclohexylene-1,4-dimethylenedioxy)bis(propylamine), and $H_2N(CH_2)_3—O—C_2H_4—O—C_2H_4—O—(CH_2)_3—NH_2$ Likewise the diamines of class (c) may be 3,3'-ethyliminobis (propylamine) and 3,3'-phenyliminobis (propylamine).

Similarly, the diamines of class (d) may be o-, m-, and p-xylene-diamines.

The preferred polyamides of the invention have a molecular weight of 1,500–5,000. This range of molecular weight is conveniently obtained by using a slight molar excess of one reactant over the other. Alternatively, the molecular weight can be controlled by adding a calculated amount of a monocarboxylic acid which acts as a chain terminator. The polyamides of the invention can be modified by incorporating another dicarboxylic acid in order to improve the solubility of the polyamide product. The aliphatic dicarboxylic acids such as adipic, 3-methyl adipic, azelaic and sebacic are particularly valuable for this purpose.

Other suitable modifying acids include isophthalic and 2,4'-methylene dibenzoic acids. The polymer made in this way should contain at least 30 mole percent of the hydroxy aromatic dibasic acid and preferably 50 mole percent or more.

Polyamides having improved solubility may also be obtained by employing a mixture of two diamines. The polyamides of the invention are soluble in acetic acid, formic acid, aqueous alcohol, dimethylformamide, gamma-butyrolacetone and ethylene carbonate. In some cases they are soluble in a methylene chloride-methanol mixture.

In practicing the invention any of the hydroxy aromatic dibasic acids as defined herein can be used to prepare the polyamides embodying this invention. Thus the hydroxy acids can be those containing a single aromatic nucleus bearing two carboxylic groups and 1 or 2 hydroxylic groups such as the phthalic acids of the formula

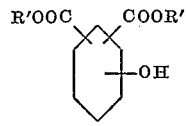

in which each R' is either hydrogen or an alkyl group, preferably of 1 to 4 carbon atoms; or the hydroxy aromatic dibasic acids can be those containing two or more unfused aromatic nuclei with a carboxylic group joined to each terminal nucleus and one phenolic hydroxyl group on at least one of the nuclei bearing a carboxylic group. These hydroxy acids thus have the formula

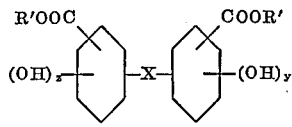

wherein y and z are either 0 or 1, one of y and z being 1, and X is either a direct bond between the two benzene rings or a hydrocarbon radical of 1–6 carbon atoms such as —CH$_2$—, —CH$_2$—CH$_2$—,

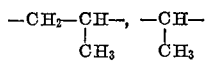

or a divalent radical selected from the group consisting of

—O—, —O—CH$_2$—CH$_2$—O—, —SO$_2$—, —S—,

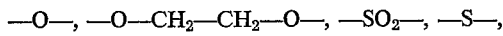

or —CF$_2$—.

In these hydroxy acids, the carboxylic groups are either meta or para to the linking group X, while the hydroxyl groups can be located in any open position including positions ortho, meta or para to the carboxyl group.

The aromatic hydroxy acids employed in practicing the inveniton are typified by, but not limited to, mononuclear monohydroxy dibasic acids of the formula

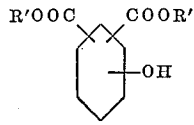

such as 2-hydroxy-terephthalic acid, 5-hydroxy-isophthalic acid, 6-hydroxy-isophthalic acid, 3-hydroxy-o-phthalic acid, 4-hydroxy-o-phthalic acid and esters of these or similar hydroxy acids; dinuclear dihydroxy dibasic acids of the formula

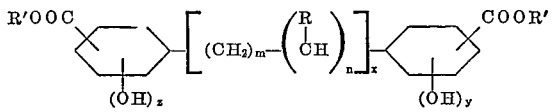

in which m, n, x, y and z are either 0 or 1, one of y and z being 1, and in which R is either hydrogen or a methyl group, such as 4,4'-dicarboxy-2,2'-dihydroxy-diphenyl methane, 4,4'-dicarboxy-2,2'-dihydroxy-diphenyl ethane, 4,4'-dicarboxy-2,2'-dihydroxy-diphenyl methyl methane, 4,4'-dicarboxy-3,3'-dihydroxy-diphenyl methyl ethane, and esters of these and similar dicarboxy hydroxy diphenyl alkanes; dicarboxy hydroxy diphenyl sulfones of the formula

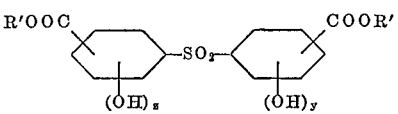

such as 3,3'-dicarboxy-4,4'-dihydroxy-diphenyl sulfone, 4,4'-dicarboxy-3,3'-dihydroxy-diphenyl sulfone, and esters of these and similar sulfone dibasic hydroxy acids; dicarboxy hydroxy diphenyl sulfides of the formula

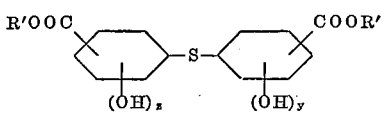

such as 3,3'-dicarboxy-4,4'-dihydroxy-diphenyl sulfide, 4,4'-dicarboxy-3,3'-dihydroxy-diphenyl sulfide, 4,4'-dicarboxy-2,2'-dihydroxy-diphenyl sulfide, and esters of these and similar dibasic hydroxy sulfides; dicarboxy hydroxy diphenyls of the formula

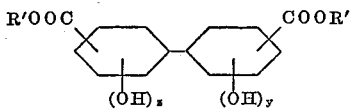

such as 4,4'-dicarboxy-3,3'-dihydroxy diphenyl ether and esters of this and similar dicarboxy hydroxy diphenyl ethers; as well as compounds of the formulas

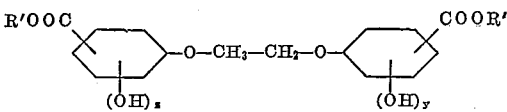

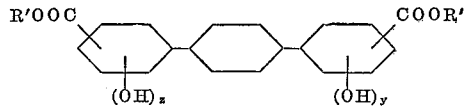

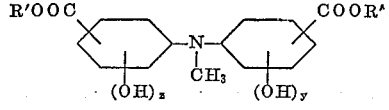

and

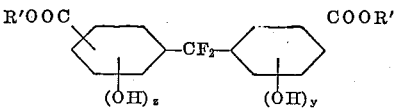

y, z and R' having the values assigned hereinabove. In each of these groups, the carboxylic radicals can be in the 3,3' and 4,4'-positions, and the hydroxyl groups can be in any of the 2,2', 3,3', 4 or 4' positions which are otherwise unsubstituted.

Another useful class of aromatic dicarboxylic hydroxy acids contains fused rings, as found in naphthalene, for example. Typical examples of such acids are:

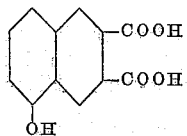

5-hydroxy-2,3-naphthalene-dicarboxylic acid,

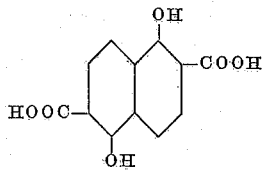

1,5-dihydroxy-2,6-naphthalene dicarboxylic acid, and

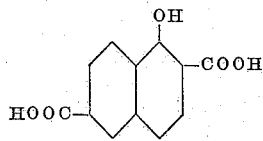

1-hydroxy-2,6-naphthalene dicarboxylic acid.

Especially useful acids for preparation of the polyamides of this invention are aromatic hydroxy dicarboxylic acids selected from the group of compounds of the formulas:

(a) 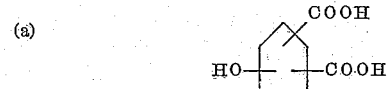

(b) 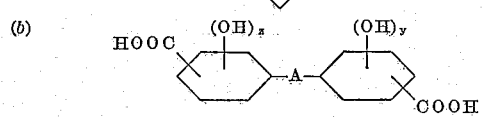

where A is selected from the group consisting of —$CH_2$—, —$SO_2$— and —O—, and where $y$ and $z$ are selected from the group consisting of zero and one, at least one of $y$ and $z$ being one, (c) 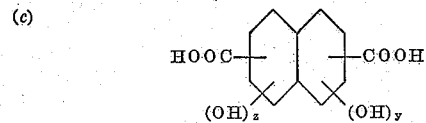

where $z$ and $y$ are selected from the group consisting of zero and one, and one of $y$ and $z$ being one, said polyamide having a molecular weight of approximately 1,500–5,000.

Polyamides having outstanding properties as mordants in accordance with the invention may be prepared by condensing 4-hydroxyisophthalic acid with 3,3'-(2,2-dimethyl-trimethylenedioxy)bis(propylamine).

The polymers prepared as described above can, in accordance with the invention, be readily incorporated with fiber-forming polymers which, although poorly or not at all dyed by basic dyes, are thus rendered susceptible of satisfactory dyeing because of the fact that the added polyamide material acts as a dye adsorber or mordant and forms sites throughout the fiber forming polymer material to which it is added which can readily take up and hold the dye.

The polyamide material, because of its solubility in a wide range of solvents for fiber-forming polymers as described above can be readily dissolved into a dope or solution of a fiber forming polymer and the resulting solution dry or wet spun by known methods to produce fibers of the blended polymers which will dye well with basic dyes.

Likewise, a suspension of the polyamide particles may be slurried onto particles of a fiber-forming polymer, the solvent or slurry medium evaporated and the resulting particles melt-spun into fibers in accordance with well known melt spinning methods. Such fibers can be readily dyed with basic dyes.

In another variation of the process, a solution of the polyamide in a volatile solvent is stirred with particles of the fiber forming polymer while the solvent is evaporated. This treatment leaves a coating of the polyamide on the polymer particles which can then be melted and spun into fibers which also dye well with basic dyes.

Alternatively, the polyamide can be mixed with the fiber-forming polymer by means of a mill or hot rolls. In this process, the polyamide is broken up into small particles that become dispersed throughout the mass of the fiber forming polymer. This mixed polymer mass can then be melt spun to produce fibers readily dyeable with basic dyes.

In producing dyeable fibers by the above described procedures in accordance with the invention from 3% to 30% and preferably 5% to 15% of the polyamide is used, based on the weight of the fiber. As indicated above the ultimate fiber may be formed from a mixture or blend of fiber-forming polymer and polyamide modifier by dry spinning, wet spinning or melt spinning.

The invention is further illustrated by the following preferred embodiments thereof which are included merely for purposes of illustration and are not intended to limit the scope of the invention.

*Example 1*

A polyamide was prepared by heating the following materials with stirring under an atmosphere of nitrogen at 200° for [about] 30 minutes, followed by 230° for 1 hour:

10.9 g. 5-hydroxyisophthalic acid
10.5 g. 3,3'-(2,2-dimethyl trimethylenedioxy)bis(propylamine)

Fifteen parts of this polymer was dissolved in dimethylformamide and mixed with a dope of 85 parts of poly(94 acrylonitrile–6 N-isopropylacrylamide) in dimethylformamide. This dope was then wet-spun to give fibers which dyed heavily with basic dyes such as Maxilon Red BL and Severon Brilliant Red 4G.

*Example 2*

One mole of diphenyl 5-hydroxyterephthalate and 0.90 mole of 1,3-butanediamine were heated at 150° for 2 hours and then at 200–220° for 2 hours in an atmosphere of nitrogen. The liberated phenol was removed by vacuum distillation. The product was a brittle glass. It was soluble in dimethylformamide and formic acid. Ten parts of the polymer was dissolved in dimethylformamide and mixed into a dope of polyacrylonitrile in dimethylformamide. Fibers spun from this dope dyed well with basic dyes.

*Example 3*

A copolyamide was prepared from sebacic acid, 5-hydroxyisophthalic acid, and 3,3'-(2,2-dimethyltrimethylenedioxy)bis(propylamine) in the ratio of 1 mole: 1 mole: 2 moles. The polymer was dissolved in 90 methylene chloride–10 methanol and mixed with cellulose triacetate in the same solvent to give a dope containing 80 parts triacetate and 20 parts polyamide. Fibers were dry-spun from this dope which dyed well with basic dyes and neutracyl dyes.

*Example 4*

Using the method of Example 1, a copolyamide was prepared from the following materials:

10.9 g. 5-hydroxyisophthalic acid
5.25 g. 3,3'-(2,2-dimethyl trimethylenedioxy)bis(propylamine)
3.48 g. 3,3'-ethyliminobis(propylamine)

a dope was made in γ-butyrolactone having the composition 70 parts poly(90 acrylonitrile–10 methyl acrylate)– 30 parts polyamide. Fibers spun from the dope dyed well with basic dyes, neutracyl dyes, acetate dyes and acid dyes.

*Example 5*

The same polyamide described in Example 3 was deposited on powdered polypropylene by evaporating a solution of the polyamide in aqueous alcohol on the powdered polypropylene. The dried mixture was then rolled on a hot roll to insure thorough mixing. The final composition was 85 parts polypropylene–15 parts polyamide. The modified polymer was melt extruded to give fibers which dyed well with basic dyes and acetate dyes.

*Example 6*

One mole of the diphenyl ester of 5,5′-methylenedisalicylic acid and 1.15 moles of 3,3′-(cyclohexylene-1,4-dimethylenedioxy)bis(propylamine) were heated and stirred in a nitrogen atmosphere at 150–160° for 2 hours and then at 200–220° for 3 hours. The phenol was removed by vacuum distillation. The product was a brittle glass, soluble in formic acid, acetic acid, dimethylformamide, dimethylacetamide, gamma-butyrolactone, and a mixture of 90% methylene chloride–10% methanol.

A. Twenty g. of the polyamide was dissolved in 60 g. of dimethylformamide and the solution was mixed with a solution of 80 g. poly(93 acrylonitrile–7 methyl acrylate) in 300 g. of dimethylformamide. The dope was then spun into fibers by the dry spinning process. The fibers dyed well with basic dyes, and acid wool dyes, and some direct cotton dyes.

B. Ten g. of the polyamide and 90 g. of cellulose acetate (38.5% acetyl) were dissolved in 400 g. of acetic acid and the mixture was extruded into aqueous acetic acid to give fibers. The fibers dyed well with basic dyes.

C. Cellulose triacetate was used in place of the cellulose acetate (38.5% acetyl) as described in B above to produce fibers which dyed well with basic dyes.

*Example 7*

One mole of diphenyl 4-hydroxy-isophthalate, one mole of diphenyl azelate and 1.8 moles of 3,3′-(2,2-dimethyl-trimethylenedioxy)bis(propylamine) were heated and stirred in a nitrogen atmosphere at 150° for 2 hours, then at 200° for 2 hours. The product was a brittle glass, soluble in dimethylformamide, ethylene carbonate, acetic acid and formic acid.

A. Fifteen g. of the polymer was intimately mixed with 85 g. of melted poly(6-aminohexanoic) acid and fibers were extruded from the melt. The fibers dyed well with basic dyes.

B. Ten g. of the polyamide (as 200 mesh powder) was mixed with 90 g. of crystalline polypropylene (200 mesh powder) and the mixture was melt spun into fibers. The fibers dyed well with basic dyes.

C. Twelve g. of the polyamide and 88 g. of crystalline polystyrene were mixed. Fibers spun from the mixture dyed well with basic dyes.

D. Fifteen g. of the polyamide and 85 g. of crystalline poly(4-methylpentene-1) were mixed and charged into a melt spinning machine. Fibers spun from the melt dyed well with basic dyes.

*Example 8*

Using the method described in Example 2, a polyamide was made from 0.4 mole 1-hydroxynaphthalene-2,6-dicarboxylic acid, 0.6 mole of sebacic acid and 0.90 mole of $H_2N(CH_2)_3O—C_2H_4—O—C_2H_4—O(CH_2)_3NH_2$.

Polyacrylonitrile fibers containing 8% of the polymer dyed well with basic dyes.

Polyester fibers made from terephthalic acid and 1,4-cyclohexanedimethanol were modified by incorporating 12% of the polyamide prior to melt spinning. The fibers dyed well with basic dyes.

*Example 9*

Using the method described in Example 2, a polyamide was made from 1.0 mole of diphenyl 4-hydroxyisophthalate, 0.6 mole of m-xylylenediamine and 0.5 mole of decamethylenediamine.

Polyethylene terephthalate fibers containing 12% of the polyamide dyed well with basic dyes.

*Example 10*

Using the method described in Example 2, a polyester was made from 1.0 mole of diphenyl 4-hydroxyisophthalate and 0.90 mole of 3,3′-(2,2-dimethyl-trimethylenedioxy)bis(propylamine).

Cellulose triacetate fibers containing 15% of the polyamide dyed well with basic dyes.

Attention is directed to the fact that the polymeric polyamides of this invention as described above are not designed for use as fiber-forming polymers in themselves but find usefulness as mordants for basic dyes, cotton dyes and acid wool dyes when used as modifiers of polymers of higher melting point which have fiber-forming properties. In other words, the polyamides of this invention derived from a hydroxy aromatic dicarboxylic acid and a diamine are of too low molecular weight and melting point to be susceptible of textile fiber formation. Their chief value, in accordance with the invention, is due to the fact that they are compatible with many of the usual fiber-forming materials such as cellulose acetate of the acetone soluble variety, cellulose triacetate, polyesters, acrylonitrile polymers, polyamides, and hydrocarbon polymers such as polyethylene and polypropylene and also because they are soluble in solvents commonly employed in the dry spinning and wet spinning of fiber-forming cellulose esters such as cellulose acetate of the acetone soluble variety, cellulose triacetate and other fiber-forming cellulose esters and mixed esters, examples of such solvents being methylene chloride, and various lower aliphatic alcohols such as methyl, ethyl, propyl, isopropyl, butyl, isobutyl and amyl alcohols, and acetic and formic acids.

It has been found that especially desirable dyeing effects may be produced by the use of the polymeric polyester modifiers or mordants of the instant invention in the dyeing of a wide variety of fiber-forming materials such as acetone soluble cellulose acetate, cellulose triacetate, polyacrylonitrile, polyesters, polyamides and polyhydrocarbons such as polyethylene and polypropylene when employing the following basic dyes:

Severon Blue B (Colour Index—Basic Blue 21)
Severon Blue 2G (Colour Index—Basic Blue 22)
Severon Bright Red 4G (Colour Index—Basic Red 14)
Severon Green B (Colour Index—Basic Green 3)
Severon Yellow R (Colour Index—Basic Yellow 11)
Methylene Blue 2B (Colour Index—Basic Blue 9)
Methylene Violet 3RD (Colour Index—Basic Violet 5)
Methyl Violet (Colour Index—Basic Violet 1)

It will be evident from the above description of my invention that it represents a distinct advance in the art of dyeing with basic and related dyes of fibers formed from a wide variety of fiber-forming polymeric materials and has solved a long standing problem in the production of dyeable fibers from polyhydrocarbons such as polyethylene and polypropylene which have heretofore been impossible to dye satisfactorily with the type of dyes in question. It is to be noted that such polyhydrocarbon fiber-forming material may be of the amorphous or crystalline types and still produce satisfactorily dyeable fibers. The preferred fibers of this type produced in accordance with the invention are those made from the relatively high melting, crystalline polyhydrocarbons such as polystyrene, polypropylene, poly(4-methylpentene), poly(vinylcyclohexane), poly(allylcyclohexane), poly(allylbenzene), etc.

Although the invention has been described in considerable detail with particular reference to certain preferred embodiments thereof, variations and modifications can be effected within the spirit and scope of the invention as described hereinabove, and as defined in the appended claims.

We claim:

1. A synthetic textile fiber susceptible of dyeing with basic dyes composed of a fiber-forming polymer containing dispersed therein from 3 to 30%, based on the weight of the fiber, of a linear polyamide consisting of the condensation product of (I) a diamine of the formula $$H_2N-B-NH_2$$

wherein B is a member selected from the group consisting of:
   (a) straight chain, branched chain and cyclic alkylene radicals containing from 2 to 12 carbon atoms,
   (b) radicals having the formula:

$$-(CH_2)_m-O-Y-O-(CH_2)_n-$$

wherein Y is a divalent radical selected from the group consisting of straight chain alkylene radicals, branched chain alkylene radicals, cyclic alkylene radicals and oxydialkylene radicals and wherein $m$ and $n$ are cardinal numbers of from 2 to 4, inclusive,
   (c) radicals having the formula:

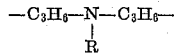

wherein R is a radical selected from the group consisting of lower alkyl and phenyl radicals, and
   (d) a radical having the formula:

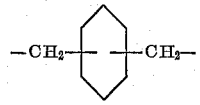

and (II) an aromatic hydroxy dicarboxylic acid selected from the group consisting of:
   (a) compounds having the formula:

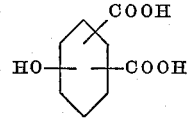

(b) compounds having the formula:

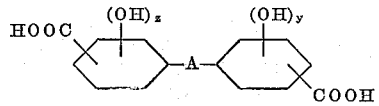

wherein A is selected from the group consisting of —CH$_2$—, —SO$_2$— and —O—, and wherein $y$ and $z$ are cardinal numbers of from zero to one, inclusive, at least one of $y$ and $z$ being one, and
   (c) compounds having the formula:

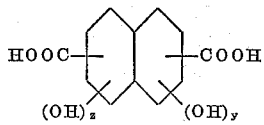

wherein $y$ and $z$ are cardinal numbers of from zero to one, inclusive, at least one of $y$ and $z$ being one, said polyamide having a molecular weight in the range of approximately 1,500–5,000.

2. A synthetic textile fiber susceptible of dyeing with basic dyes composed of a fiber-forming polymer containing dispersed therein from 3 to 30%, based on the weight of the fiber, of a linear polyamide as defined in claim 1 wherein said polyamide component (I) has the formula (b) as defined by claim 1.

3. A synthetic textile fiber susceptible of dyeing with basic dyes composed of a fiber-forming polymer containing dispersed therein from 3 to 30%, based on the weight of the fiber, of a linear polyamide as defined in claim 1 wherein said polyamide component (II) has the formula (b) as defined by claim 1.

4. A synthetic textile fiber susceptible of dyeing with basic dyes composed of a fiber-forming polymer containing dispersed therein from 3 to 30%, based on the weight of the fiber, of a linear polyamide which is the condensation product of 4-hydroxyisophthalic acid and 3,3'-(2,2-dimethyl-trimethylenedioxy)bis(propylamine).

5. A synthetic textile fiber susceptible of dyeing with basic dyes, composed of a fiber-forming polymer selected from the group consisting of acetone soluble cellulose acetate, cellulose triacetate, polymers containing at least 50% acrylonitrile, high melting crystalline polyesters, polyamides and polyhydrocarbons and containing dispersed therein from 3 to 30%, based on the weight of the fibers, of a linear polyamide consisting of the condensation product of (I) a diamine of the formula $$H_2N-B-NH_2$$

wheren B is a member selected from the group consisting of:
   (a) straight chain, branched chain and cyclic alkylene radicals containing from 2 to 12 carbon atoms,
   (b) radicals having the formula:

$$-(CH_2)_m-O-Y-O-(CH_2)_n-$$

wherein Y is a divalent radical selected from the group consisting of straight chain alkylene radicals, branched chain alkylene radicals, cyclic alkylene radicals and oxydialkylene radicals and wherein $m$ and $n$ are cardinal numbers of from 2 to 4, inclusive,
   (c) radicals having the formula:

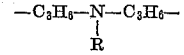

wherein R is a radical selected from the group consisting of lower alkyl and phenyl radicals, and
   (d) a radical having the formula:

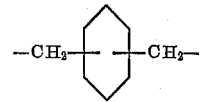

and (II) an aromatic hydroxy dicarboxylic acid selected from the group consisting of:
   (a) compounds having the formula:

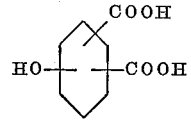

(b) compounds having the formula:

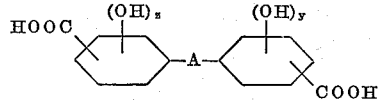

wherein A is selected from the group consisting of —CH$_2$—, —SO$_2$— and —O—, and wherein $y$ and $z$ are cardinal numbers of from zero to one, inclusive, at least one of $y$ and $z$ being one, and
   (c) compounds having the formula:

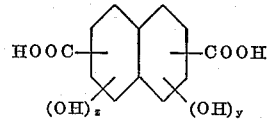

wherein $y$ and $z$ are cardinal numbers of from zero to one, inclusive, at least one of $y$ and $z$ being one, said polyamide having a molecular weight in the range of approximately 1,500–5,000.

6. A synthetic textile fiber susceptible of dyeing with basic dyes, composed of a fiber-forming polymer selected from the group consisting of acetone soluble cellulose acetate, cellulose triacetate, polymers containing at least 50% acrylonitrile, high melting crystalline polyesters, polyamides and polyhydrocarbons and containing dispersed therein from 3 to 30%, based on the weight of the fibers, of a linear polyamide as defined by claim 1 wherein said polyamide component (I) has the formula (b) as defined by claim 1.

7. A synthetic textile fiber susceptible of dyeing with basic dyes, composed of a fiber-forming polymer selected from the group consisting of acetone soluble cellulose acetate, cellulose triacetate, polymers containing at least 50% acrylonitrile, high melting crystalline polyesters, polyamides and polyhydrocarbons and containing dispersed therein from 3 to 30%, based on the weight of the fibers, of a linear polyamide as defined by claim 1 wherein said polyamide component (II) has the formula (b) as defined by claim 1.

8. A synthetic textile fiber susceptible of dyeing with basic dyes, composed of a fiber-forming polymer selected from the group consisting of acetone soluble cellulose acetate, cellulose triacetate, polymers containing at least 50% acrylonitrile, high metling crystalline polyesters, polyamides and polyhydrocarbons and containing dispersed therein from 3 to 30%, based on the weight of the fibers, of a linear polyamide which is the condensation product of 4-hydroxyisophthalic acid and 3,3'-(2,2-dimethyl-trimethylenedioxy)bis(propylamine).

References Cited in the file of this patent

UNITED STATES PATENTS

| | | |
|---|---|---|
| 2,279,745 | Stevenson | Apr. 14, 1942 |
| 2,913,433 | Wittbecker | Nov. 17, 1959 |
| 2,931,272 | Haas | Apr. 5, 1960 |
| 3,035,091 | Wygant | May 15, 1962 |

FOREIGN PATENTS

| | | |
|---|---|---|
| 614,063 | Great Britain | Dec. 8, 1948 |